United States Patent [19]
Fortna et al.

[11] 3,747,876
[45] July 24, 1973

[54] VARIABLE LOAD FEEL

[75] Inventors: Steven L. Fortna, Long Beach; Ronald W. Koroch, Cerritos, both of Calif.

[73] Assignee: McDonnell Douglas Corporation, Santa Monica, Calif.

[22] Filed: June 1, 1971

[21] Appl. No.: 148,613

[52] U.S. Cl. ............... 244/83 D, 74/470, 74/522
[51] Int. Cl. ............................................. B64c 13/04
[58] Field of Search ............ 244/83 D, 83 R, 776 V, 244/75 R, 76 B; 74/470, 522

[56] References Cited
UNITED STATES PATENTS
2,881,631  4/1959  Riccius ................................. 74/470

*Primary Examiner*—Milton Kaufman
*Attorney*—Walter J. Jason, Donald L. Royer and George W. Finch

[57] ABSTRACT

A system to generate control surface feedback forces in an aircraft employing powered control surfaces. The system is primarily mechanical in nature and includes at least two springs as the force generating elements, and means which predeterminately interconnect the springs, predeterminately vary the preload of one spring, and predeterminately vary the effective spring rates of the springs in correspondence to the flight conditions of the aircraft.

11 Claims, 3 Drawing Figures

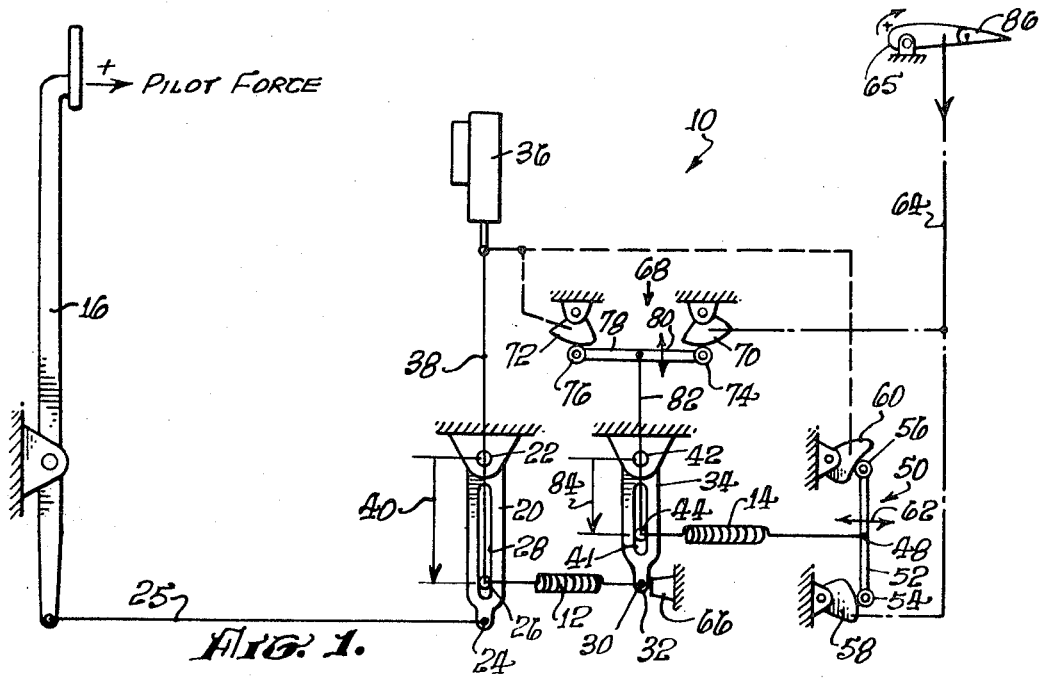

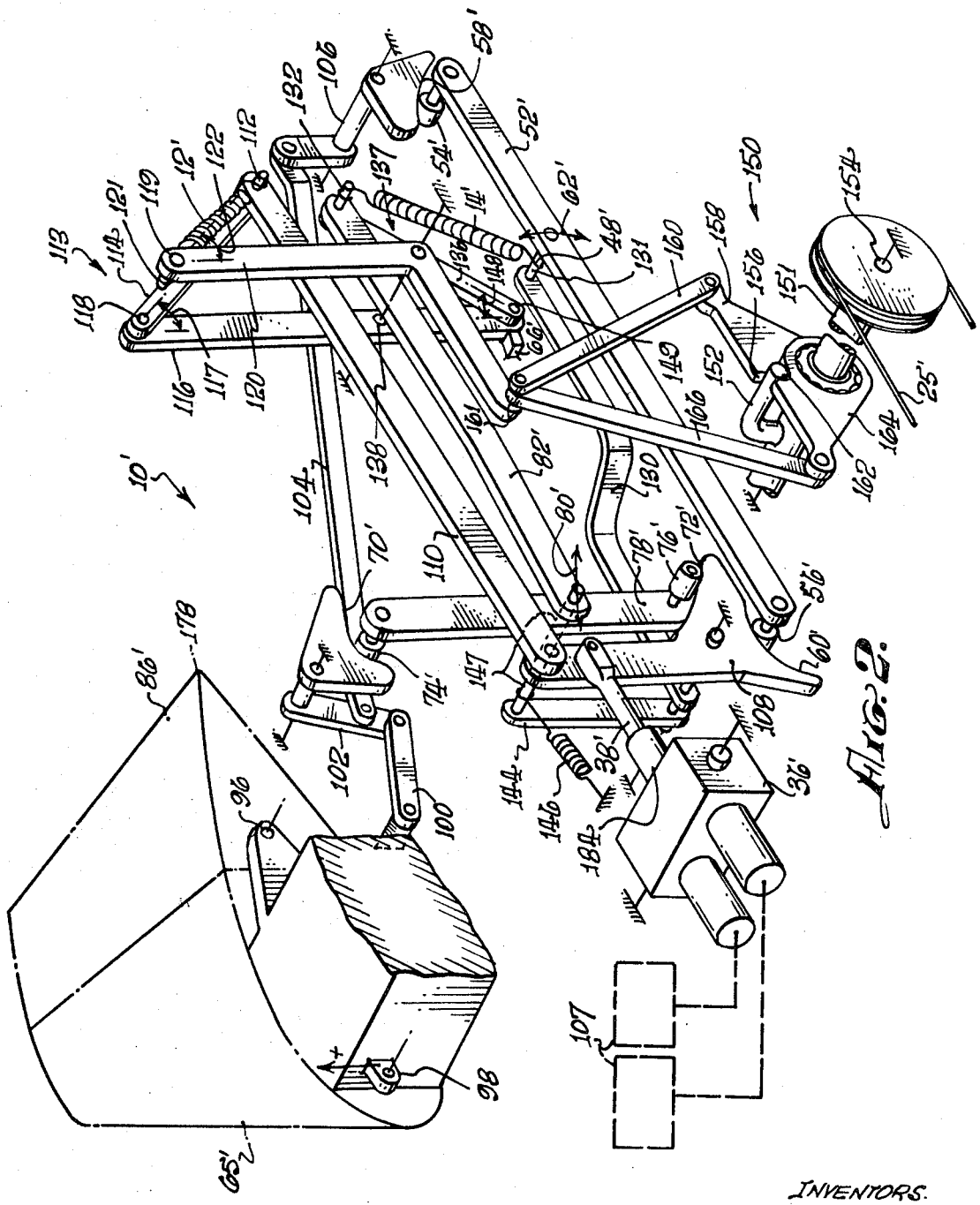

VARIABLE LOAD FEEL

BACKGROUND OF THE INVENTION

All aircraft require some sort of force feedback from the control surfaces through the control system to the pilot so that the pilot can fly the aircraft in a stable manner. In small aircraft, the force feedback is usually accomplished by connecting the pilot controls directly to the aerodynamic control surfaces so that the aerodynamic forces thereon feed back to the pilot. However, as airplanes get larger, the forces that can be applied manually by a pilot are insufficient for adequate control of the aircraft and hydraulic or other types of power assist must be used to move the control surfaces. When the control surfaces are moved by a powered system most, if not all, of the aerodynamic forces or "feel" previously fed back to the pilot are lost and artificial feedback force generating means must be provided to enable the pilot to "feel" the action of the control surfaces.

Many different schemes have been devised to provide artificial control surface feel for aircraft. These schemes include simple centerloading springs, pressure modulated hydraulic systems, and Q-bellows pneumatic systems. Each system has its own advantages and/or disadvantages in maintainability, reliability, weight, adaptability, redundancy and flexibility which must be traded off against each other.

It is desirable that the forces fed back to the pilot be approximately proportional to the accelerational forces he is inducing by his control action throughout the entire flight envelope of the aircraft. In the case of aileron and rudder controls on an aircraft their ability to cause accelerations vary primarily with airspeed or more properly, dynamic pressure. Therefore, suitable feed forces can usually be generated by simply modulating a single spring in proportion to the airspeed or by using a simple spring arrangement and disconnecting control surfaces to compensate for increased control effectiveness at higher airspeeds. In the case of elevator control surfaces, however, their ability to cause acceleration varies not only with airspeed but also with the position of the longitudinal center of gravity of the aircraft. The longitudinal center of gravity of large aircraft, because of differing loads and fuel supplies, tends to move through a wide range. Such aircraft also have a flight envelope encompassing large variations in airspeed. Since both airspeed and the position of the center of gravity change the elevator effectiveness and therefore, the acceleration that can be produced by a given movement of the elevator, both variables, airspeed and center of gravity, must be used to modify the output of an elevator feedback force generating system if the desired relatively constant feedback force per acceleration produced is to be obtained. Furthermore, artificial feel systems must provide initial force gradients sufficiently steep to assure the stability of the aircraft.

SUMMARY OF THE INVENTION

The present variable load feel mechanism includes two springs which function as the artificial force generating means. The first spring is connected to the pilot's control through means which modify the effective spring rate of the first spring in correspondence to inputs representative of airspeed or the effective dynamic pressure acting upon the aircraft. The first spring creates a family of relatively steep initial force gradients which assure that the aircraft remains stable. The second spring is connected to the first spring by other means which modify the effective spring rate of the second spring in correspondence to inputs primarily representative of the airspeed and the center of gravity of the aircraft. The second spring is also connected to means which vary the preloading thereof in response to the airspeed and the center of gravity of the aircraft. Therefore, as the controls are first moved by the pilot to move the control surfaces, the first spring is stretched to feedback an initial force gradient required for stability. When the force applied by the pilot by further movement of the control in opposition to the feedback force reaches a predetermined point, determined by the preloading of the second spring, the second spring is placed in series with the first to generate a secondary force gradient. The effective spring rate and the preloading of the second spring is usually varied by a mechanical input corresponding to the trimmed position of the horizontal stabilizer, since the trim of the horizontal stabilizer is a function of the center of gravity and airspeed of the aircraft. The second spring rate and preload varying means are also modified by a direct airspeed input. This is done to compensate for changes in the total force gradient when a secondary force gradient is being generated and the airspeed is changed but the stabilizer position is held constant. Otherwise the mechanism would undesirably change the force output due to the fact that the secondary gradient is created by the two springs in series. As the primary (airspeed) spring rate is reduced, the secondary spring rate must be increased to compensate and create an unchanging secondary gradient.

The present variable load feel mechanism can be used in any aircraft which requires powered control systems. The design uses simple cranks, cams, pushrods, and springs to achieve a complicated force feel program heretofore achieved only by complicated hydraulic or pneumatic computer arrangements. Also, the present mechanism offers flexibility for modification so that it can be used in future aircraft configurations without extensive redesign.

If the feel forces are lost for any reason in an all powered control surface aircraft, the aircraft will become unstable and probably uncontrollable. Therefore, it is important that artificial feel means are designed with safety in mind. The mechanism described herein enables the use of redundancy in all components whose failure would cause a loss of feel forces to assure the safety thereof.

The mechanism has very low maintenance requirements since no adjustments are needed after initial installation and it can be built so no lubrication is required during the lifetime of the aircraft. Since the mechanism is primarily mechanical and can be constructed to allow quick visual inspection, troubleshooting and maintenance is extremely simple. If some problem does occur, the mechanism can be easily replaced by unbolting it and substituting a new mechanism without interrupting other systems on the aircraft. This is extremely beneficial since the prior art hydraulic feel systems, when repaired or replaced, require a complete recalibration on the aircraft. This is because their operation depends not only on their internal components but also on the hydraulic systems in which they are installed.

It is therefore an object of the present invention to provide articial feel means which provide feedback force to the pilot which varies with the control surface effectiveness so that a given force applied to the control induces a constant acceleration throughout the flight envelope of the aircraft.

Another object is to provide an artificial feel mechanism which is safe and easy to maintain.

Another object is to provide artificial feel means that are adaptable to many different types of aircraft with relatively little modification.

Another object is to provide a relatively sophisticated variable load feel force program for an aircraft by means of a relatively simple device.

Another object is to provide a load feel mechanism which can be constructed in a redundant manner to assure that the failure of any one component therein will not cause disastrous loss of feedback force to the pilot.

These and other objects and advantages of the present invention will become apparent after considering the following detailed specification which covers preferred embodiments thereof in conjunction with the accompanying drawings wherein:

BRIEF DESCRIPTION OF THE DRAWINGS

FIG. 1 is a simplified diagrammatic representation of a load feel mechanism constructed according to the present invention;

FIG. 2 is also a variable load feel mechanism constructed according to the present invention but embodying most of the mechanical principles involved in actual load feel mechanisms incorporated in DC–10 aircraft manufactured by the McDonnell Douglas Corporation; and FIG. 3 is a graph of the control forces applied to the control column of a DC–10 aircraft versus the elevator deflection thereof for various airspeeds and horizontal stabilizer positions.

DETAILED DESCRIPTION OF THE SHOWN EMBODIMENTS

Referring to the drawings more particularly by reference numbers, number 10 in FIG. 1 refers to a variable load feel mechanism constructed according to the present invention. The mechanism 10 generates an initial family of relatively steep feedback force gradients which vary with airspeed and which are required to assure stability of the aircraft. The mechanism 10 also generates a secondary family of feedback force gradients which vary as a function of control surface effectiveness so that a given force is generated in opposition to control movement sufficient to produce a predetermined acceleration of the aircraft. The mechanism 10 provides the two families of feedback force gradients to the pilot through the use of a primary spring 12 and a secondary spring 14. The primary spring 12 is operatively connected to the pilot's control column 16 and provides the initial feel forces thereto whose gradients are independent of the action of the secondary spring 14.

The primary spring 12 is connected to the control column 16 by means of a lever 20 which is connected at one end to structure by a pivot 22. The other end 24 of the lever 20 is connected to the control column 16 through suitable means which are usually a combined linkage and cable system 25. One end 26 of the spring 12 is adapted for sliding movement in a slot 28 in the lever 20 while the other end 30 of the spring 12 is connected to one end 32 of another lever 34 similar to lever 20 which will be described hereinafter.

The initial force gradients are varied by varying the leverage of the primary spring 12 with respect to lever 20. This leverage is varied by means such as actuator 36 which is connected at approximately a right angle to the spring end 26 by a link 38. The position of the spring end 26 with respect to the pivot 22 defines a variable moment arm 40. The actuator 36 varies the length of the moment arm 40 with respect to variations in airspeed or dynamic pressure so that an increase in airspeed lengthens the arm 40 and increases the feedback force applied to the control column 16 per unit of movement away from center thereof or in other words, steepens the initial feedback force gradient.

The secondary spring 14 is connected to the primary spring 12 through the lever 34. As aforesaid, the lever 34 is similar to lever 20, including a slot 41 at approximately a right angle to the spring 14 and a pivot 42 by which the lever 34 is connected to structrue. One end 44 of the secondary spring 14 is adapted to be predeterminedly positioned in the slot 41. The other end 48 of the spring 14 is connected to means 50 which, by moving the end 48 of the spring 14, can predeterminately vary the preload tension therein in relation to the horizontal stabilizer trim and the airspeed of the aircraft.

The means 50 as shown include a bar 52 having cam followers 54 and 56 on the opposite ends thereof. The cam followers 54 and 56 ride on cams 58 and 60 respectively and provide motion of bar 52 in the directions of the arrows 62. The cam 58 is controlled by a connection 64 which feeds information thereto from the position of the horizontal stabilizer 65 of the aircraft since stabilizer position is generally representative of the center of gravity which in turn is representative of elevator effectiveness. The other cam 60 is connected to the airspeed actuator 36 as shown. The function of the cam 60 is to modify the preload in the spring 14 with airspeed to maintain the secondary family of feedback force gradients as the airspeed is changed.

By moving the spring end 48, the means 50 change the preloading of the spring 14, thus changing the force applied by the lever 34 against its stop 66. For example, an increased preload, which is primarily caused by the stabilizer 65 rotating in the positive (+) direction shown, means that more control movement, opposed by an initial force gradient, is required before the arm 34 moves away from the stop 66, putting spring 14 in series with spring 12, thus causing the mechanism 10 to feed back forces in accordance with a less steep secondary gradient.

Means 68, similar to means 50, also vary the force applied by lever 34 against the stop 66 by varying the leverage of the spring 14. This is accomplished by moving the end 44 of the spring 14 in the slot 41. The means 68, like means 50, include two cams, 70 and 72, which are controlled by inputs from the horizontal stabilizer 65 and the airspeed actuator 36 respectively. The cams 70 and 72, through cam followers 74 and 76, a connecting bar 78 therebetween which is restrained to move in the direction shown by the arrows 80, and a link 82 between the bar 78 and the end 44 of the spring 14, vary the moment arm 84 between the pivot 42 and the spring end 44. The moment arm 84 is lengthened by means 68 as the horizontal stabilizer 65 is rotated in the positive direction indicating a rearward center of gravity and therefore more elevator effectiveness. This causes the mechanism 10 to apply a feedback force of a steeper secondary gradient to desensitize the pilot's controls in correspondence to the increased effectiveness of the elevator 86. Like means 50, means 68 use the input from the airspeed actuator 36 to modify the moment arm 84 to maintain the desired secondary gradient feedback force generating condition.

The variable load feed mechanism 10' of FIG. 2 functions like the mechanism 10 shown in FIG. 1 but it is configured in a manner more adaptable to pracitcal use than functional explanation. The portions of mechanism 10' which are essentially functional duplicates of portions of the mechanism 10 in FIG. 1 are identified by the same numbers and a prime('). Since the mechanism 10' is configured to provide elevator control feel, the inputs for varying the feel thereof are similar to those for mechanism 10; that is, one is an input which is representative of the angle of incidence of the horizontal stabilizer 65' and the other is the airspeed input.

The horizontal stabilizer 65' is pivoted about pivot 96 by jack screws or other similar means attached at point 98 to keep the aircraft in a trimmed pitch condition during normal flight. The trimmed position of the horizontal stabilizer 65' which is a measure of changes in elevator effectiveness caused by changes in center of gravity, is fed through links 100 and 102 to cam 70' and further through links 104 and 106 to cam 58'. The airspeed input in generated in air data computers 107 which electrically control movement of a dual motor airspeed actuator 36' which responds to changes in airspeed by moving link 38' and rotating a member 108 connected thereto which includes the cams 60' and 72'. Another link 110 connects the member 108 to one end 112 of the primary spring 12' and to figure four linkage 113 including links 114 and 116. The airspeed input varies the angle 117 between links 114 and 116 in the figure four linkage 113. When the mechanism 10' is unstressed, the pivot 118 between links 114 and 116 is in alignment wilh the end 119 of an output lever 120 to which the other end 121 of the spring 12' is attached. Changes in the angle 117, therefore cause the spring 12' to assume a similar angle 122 with respect to the output lever 120. The angle 122 between the primary spring 12' and the output lever 120 determines the leverage of the spring 12' in generating the proper initial feedback force gradient. The slope of this force gradient varies directly with the square of the sine of the angle 122 between the spring 12' and the output lever 120. With the orientation of the mechanism 10' shown in FIG. 2, an upward airspeed change will cause link 110 to move to the right which in turn causes link 114 to increase the angles 117 and 122. Thereafter, any movement of the elevator controls will be more strongly resisted by the spring 12' since increasing the angle 122 changes the gradient of the initial feedback force to a steeper value. Of course, moving the link 110 to the left reduces the angle 122 so that the gradient of the feedback force applied through the output lever 120 by the spring 12' is lessened. Since the spring 12' is connected to the output lever end 119 in general alignment with the pivot 118 between links 114 and 116, movement of the link 110 merely changes the angle 122 and does not preload the spring 12'. This can be seen by reference to FIG. 3, which is a graph of control force in pounds of pull versus corresponding elevator deflection degrees for an actual DC-10 aircraft, in which all initial gradients end at the same point.

The initial force gradients in FIG. 3 are shown in solid lines and appropriate examples are identified by the airspeeds at which they would be generated. It should be realized that the present mechanisms 10 and 10' are capable of generating an infinite number of primary gradients such as gradients 123 and 124 and only representative gradients are shown in FIG. 3. This is also true of the secondary gradients shown as dashed lines. During high airspeed conditions, the actuator 36' will cause the link 110 to move to the right to steepen the gradient as aforesaid. If, for example, the airspeed is 298 knots, forces in correspondence with the relatively steep gradient 123 will be fed back to the pilot while at slower speeds such as 122 knots, forces corresponding to the flatter gradient 124 will be fed back to the pilot which, of course, allows greater elevator deflection with a given control force.

The secondary gradients are generated by combining the spring forces generated by springs 12' and 14' and as before, the secondary spring 14' is variable both in its effective spring rate and its preloading. The variation in the preloading of the spring 14' is made in correspondence to stabilizer incidence angle and airspeed as in the mechanism 10. This is accomplished by means of bar 52' which can be moved in the direction indicated by arrows 62' by the cams 58' and 60' and cam followers 54' and 56' respectively. The bar 52' is pivoted to structure by a link 130 so that its movement is restrained to the direction shown. The end 48' of the secondary spring 14' is connected to a rod 131 connecting the link 130 and the bar 52' while the other end thereof is connected to a pivot 132 between link 82' and link 136 which two links 82' and 136, along with link 116, form a second figure four linkage 137. Therefore, movements in the direction of arrows 62' tend to vary the tension and hence the preloading of the spring 14'.

This variable preloading is applied through link 136 to link 116 which is pivoted at a central location 138 thereof. When the tension in spring 12' reaches a predetermined percentage of the tension in spring 14', a proportion that is geometrically determined by the figure four linkages 113 and 137 and their common pivoted link 116, the link 116 will rotate counterclockwise off its stop 66'. This places the springs 12' and 14' in series and reduces the slope of the force gradient of the mechanism 10' applied to the output lever 120 to the proportionate summation of spring rates of the two springs; a spring rate which is less than either rate individually.

The effective spring rate of the secondary spring 14' is changed or varied in a manner similar to the way the effective spring rate of the primary spring 12' is varied, that is, by means of the figure four linkage 137. The variable input to the figure four linkage 137 is generated by cams 70' and 72' through cam followers 74' and 76' respectively and bar 78'. The bar 78' is pivoted to structure by link 144 and a spring 146 is connected to the pivot rod 147 therebetween to restrain the bar 78' with its connected cam followers 74' and 76' against the cams 70' and 72' so the bar 78' moves in the direction of arrows 80' as shown. Movement in the direction of arrows 80' causes the link 82' connected to the bar 78' by the rod 147 to move longitudinally to change the angle 148 between the links 136 and 116 of the figure four linkage 137 to vary the effective spring rate of the secondary spring 14' in proportion to the square of the sine of the angle 148. The pivot 149 between links 116 and 136 is usually in approximate alignment with the rod 131 so the preloading of the spring 14' is not substantially changed when the angle 148 is varied. Therefore, as the cam 70' causes movement of the link 82' to the right indicating a movement of the horizontal stabilizer 65' in the positive (+) direction shown, the angle 148 is increased and more of the spring rate 14' is applied to steepen the secondary gradient. Just the opposite is true when the horizontal stabilizer 65' is moved in the opposite direction causing the link 82' to move left, decreasing the angle 148 and thereby flattening the slope of the secondary gradient. As in mechanism 10, the cams 72' and 60' are used to vary the output of the secondary spring 14' inversely with airspeed to eliminate the effects of airspeed changes on the secondary gradient caused by changes to the effective spring rate of the primary spring 12' as aforesaid.

It should be noted that positive or negative movement of the control column is applied to the mechanism 10' through means such as cable 25'. Since the mechanism 10' can only generate forces in one direction, means 150 must be employed to cause either positive or negative control column movements to stress the artificial feed mechanism 10' in the same direction. The means 150 do this by converting movements of the cable 25' into rotations of a shaft 151 which cause rotations of a rod 152 about the axis 154 of the shaft 151. As can be seen, clockwise movement of the rod 152 about the axis 154 causes the rod 152 to contact an abutment surface 156 of a member 158 pivoted to the shaft 151. The member 158 is pivotally connected through a link 160 to the output lever 120 and it tends to pull the end 161 thereof downwardly to rotate the output lever 120 in the counter clockwise direction about the pivoted center 138 of the link 116 which stresses the mechanism 10' to generate feedback force. A counter-clockwise rotation of the shaft 151 has the same result as it causes the rod 152 to contact an abutment surface 162 of a member 164 to rotate the member 164 in a counter-clockwise direction about the shaft 151. The member 164 is connected to the end 161 of the output lever 120 by means of link 166 and rotation thereof causes the link 166 to pull the end 161 down to again rotate the output lever 120 in the counter-clockwise direction. Therefore, no matter whether positive or negative control movements are applied to the control column, the mechanism 10' is always stressed in the same manner to provide variable artificial feel forces against the column which tend to retain it in a neutral position.

By referring again to FIG. 3 it is possible to see the forces that will be applied by the artificial feel mechanism 10' during certain specific conditions. If, for example, the aircraft is flying at 298 knots with a 5° positive angle on the horizontal stabilizer 65', the control force required to move the elevator 86' a given deflection can be found by following gradient 123 to crossover point 170 at which time the secondary spring 14' is placed in series with the primary spring 12' and further control movement will cause feedback forces which are in correspondence with secondary gradient 172. If the horizontal stabilizer 65' was instead in the 0° position, the transfer from the primary gradient 122 to another secondary gradient 174 would have occurred at point 176 instead. Therefore, the present mechanism provides the initial steep gradients needed for stability and thereafter provides secondary gradients which generate the proper feedback force to the control column so that a given force applied to the control column by the pilot causes predetermined acceleration of the aircraft throughout the flight regime of the aircraft. The gradients of FIG. 3 only go to 103 pounds of control force since at that point the DC-10 aircraft, for which the present mechanism 10' is specifically designed, effectively provides nearly constant control column forces for further movement of the elevators 86'. This is accomplished by external override mechanisms between the present mechanism 10' and the control column. Also, since the elevator deflection on a DC-10 is limited to 16.5° trailing edge 178 down and 27° trailing edge 178 up, appropriate lines 180 and 182 are included to indicate the elevator deflection limits. Other than having different elevator deflection limits, the artificial feel force mechanism 10' operates similarly whether the control force is positive that is, the pilot pulling the control column towards himself so that the aircraft assumes a more positive angle of attack and climbs, or negative where the pilot pushes the control column away from himself to produce decreasing angles of attack and a dive condition of the aircraft. Also all the initial force gradients start at 4 pounds because that happens to be the centering force and the friction forces in the DC-10. The centering force is provided by means such as an external centering spring (not shown).

The mechanism 10' is a simplified version of the actual DC-10 variable load feel mechanism which is constructed with almost 100 percent redundancy in parts and with springs 12' and 14' in each half of the mechanism which have one half the required spring rate. This is done so any one component within the mechanism can break and at least one half of the original feedback force will be available to keep the aircraft controllable. Another safety feature is gained by making the dual airspeed actuator 36' irreversable by including drive means such as a high reduction ratio jackscrew 184 so in the event both motors in the actuator 36' fail, the output link 38' of the actuator 36' tends to remain in what ever position it was in. If the actuator motors fail during takeoff or landing when the airspeed is low, the pilot just lands the aircraft without ever needing the steep force gradients. When the actuator motors fail in a high airspeed condition, higher than normal force feedback is produced as the aircraft slows down for landing. However, since landing approaches are usually made with the stabilizer 65' trimmed at a substantial negative angle, any substantial control movement, such as is required to flare the aircraft, causes a feedback of force in correspondence to a secondary gradient. Since the secondary gradients associated with a landing condition stabilizer setting are very similar to the primary gradients associated with landing speed, the forces required for the flare maneuver are only slightly above normal.

It should be obvious that although the mechanisms 10 and 10' are shown and described herein as being primarily elevator feel mechanisms, they are adaptable to any application where initial steep force gradients are required and secondary lesser force gradients corresponding to control surface effectiveness are desired for greater than initial control motions or deflections.

Thus, there has been shown and described novel variable feel mechanisms which fulfill all the objects and advantages sought therefor. Many changes, modifications, variations and other uses and applications of the subject variable load feel mechanisms will, however, become apparent to those skilled in the art after considering this specification and the accompanying drawings. All such changes, modifications, alterations, other uses and applications which do not depart from the spirit and scope of the invention are deemed to be covered by the invention which is limited only by the claims which follow.

What is claimed is:

1. A mechanism to generate control surface feedback forces for an aircraft control system including:
   primary spring means adapted to be connected to the control system to apply forces thereto which resist movements away from a predetermined position thereof, said primary spring means including means to vary the effective spring rate thereof in correspondence to a first input;
   secondary spring means including means to vary the effective spring rate thereof in correspondence to a second input and means to vary the preload thereof in correspondence to the second input; and
   force sensitive means to connect said secondary spring means in series with said primary spring means whenever the force applied by said primary spring means to the control system exceeds the preload of said secondary spring means.

2. The mechanism defined in claim 1 wherein said primary spring means include:
   a spring;
   lever means to operatively connect said spring to the control system; and
   means to vary the angle between said lever means and said spring to vary the effective spring rate thereof in correspondence to the first input.

3. The mechanism defined in claim 1 wherein said secondary spring means include:
   a spring;
   lever means to operatively connect one end of said spring to said force sensitive means;
   means to vary the angle between said force sensitive means and said spring to vary the effective spring rate of said spring in correspondence to the second input; and
   means connected to move the other end of said spring with respect to said one end to vary the preload in said spring in correspondence to said second input.

4. The mechanism defined in claim 1 wherein a portion of the second input is a function of the first input, said secondary spring means including:
   means responsive to the first input to vary the effective spring rate thereof in correspondence to the first input; and
   means responsive to the first input to vary the preload thereof in correspondence to the first input.

5. The mechanism defined in claim 1 wherein the control surface is the elevator control surface, the first input is dynamic pressure and the second input is horizontal stabilizer position which includes elevator effectiveness information, said secondary spring means including:
   means responsive to the dynamic pressure input to vary the effective spring rate thereof in correspondence to the dynamic pressure; and
   means responsive to the dynamic pressure input to vary the preload thereof in correspondence to the dynamic pressure, whereby said secondary spring means modify the effect of variations in the effective spring rate of said primary spring means made in response to changes in dynamic pressure.

6. The mechanism defined in claim 1 wherein said secondary spring means include:
   a spring;
   lever means to operatively connect said spring to said force sensitive means; and
   means to vary the leverage between said force sensitive means and said spring to vary the effective spring rate of said spring.

7. The mechanism defined in claim 1 including:
   an actuator responsive to electrical inputs representative of the first input, said actuator having a mechanism output connected to vary the effective spring rate of said primary spring means in correspondence to the first input, said actuator including irreversible means which maintain said mechanical output fixed if said actuator ceases to function.

8. The mechanism defined in claim 1 wherein said primary spring means include:
   a first spring having one-half the desired spring rate;
   a second spring having one-half the desired spring rate; and
   means to vary the effective spring rates of said first and second springs in correspondence to the first input.

9. The mechanism defined in claim 1 wherein said secondary spring means include:
   a first spring having one-half the desired spring rate;
   a second spring having one-half the desired spring rate;
   means to vary the effective spring rates of said first and second springs in correspondence to the second input and inversely in relation to the first input; and
   means to establish and vary the preload of said first and second springs in correspondence to the second input and inversely in relation to the first input.

10. The mechanism defined in claim 1 wherein the control system can be moved to positive and negative positions from the predetermined position, said mechanism including:
    output means for connecting said primary spring means to the control system, said output means including means which apply the feedback force generated by said mechanism to resist motion of said control system to both positive and negative positions.

11. Means for generating artificial feel for the control system of an aircraft including:
    first means for applying one of a first family of force gradients to the control system;
    means connected to said first means responsive to inputs representative of the airspeed of the aircraft to control which gradient of the first family is applied to said control system;
    second means for controllably applying one of a second family of force gradients to the control system; and means connected to said second means responsive to inputs representative of the elevator effectiveness of the aircraft to control which gradient of said second family is applied to said control system and to control the amount of force required to be applied to the control system by said first means before said second family of gradients is applied thereto, whereby said first family of gradients is sufficiently steep to assure stability of the aricraft and said second family of gradients assure that a predetermined force will be applied in opposition to movement of the control system to a position sufficient to cause a predetermined acceleration of the aircraft.

* * * * *